United States Patent [19]

Wu

[11] Patent Number: 5,342,434

[45] Date of Patent: Aug. 30, 1994

[54] GAS PERMEABLE COATED POROUS MEMBRANES

[75] Inventor: Huey S. Wu, Newark, Del.

[73] Assignee: W. L. Gore & Associates, Inc., Newark, Del.

[21] Appl. No.: 100,506

[22] Filed: Jul. 30, 1993

Related U.S. Application Data

[63] Continuation-in-part of Ser. No. 990,310, Dec. 14, 1992, Pat. No. 5,286,279.

[51] Int. Cl.$^5$ .................. B01D 53/22; B01D 69/12
[52] U.S. Cl. ........................... 96/13; 96/14; 55/524; 428/308.4; 428/412; 428/433; 428/480
[58] Field of Search ............ 95/45; 96/11–14; 428/308.4, 313.5, 319.3, 412, 423.1, 480; 55/524

[56] References Cited

U.S. PATENT DOCUMENTS

| | | | |
|---|---|---|---|
| 3,953,566 | 4/1976 | Gore | 264/288 |
| 4,814,412 | 3/1989 | Crowther et al. | 428/308.4 X |
| 4,835,300 | 5/1989 | Fukui et al. | 560/25 |
| 4,897,091 | 1/1990 | Paternak et al. | 95/46 |
| 4,909,989 | 3/1990 | Fukazawa et al. | 96/6 X |
| 5,019,140 | 5/1991 | Bowser et al. | 96/6 |
| 5,053,060 | 10/1991 | Kopf-Sill, et al. | 95/46 |
| 5,066,683 | 11/1991 | Dillon et al. | 95/52 X |
| 5,078,755 | 1/1992 | Tozawa et al. | 95/46 |
| 5,082,472 | 1/1992 | Mallouk et al. | 95/49 |
| 5,094,895 | 3/1992 | Branca et al. | 428/308.4 X |
| 5,123,937 | 6/1992 | Shibata et al. | 95/46 |
| 5,157,058 | 10/1992 | Dillon et al. | 95/52 X |

OTHER PUBLICATIONS

ZONYL® Fluorochemical intermediates Pamphlet, DuPont Company.

*Primary Examiner*—Robert Spitzer
*Attorney, Agent, or Firm*—Gary A. Samuels

[57] ABSTRACT

A gas permeable material having continuous pores through it, in which the pore interiors are coated with a coating composition of the formula:

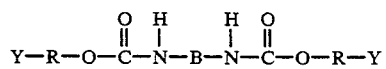

wherein
B is selected from the class consisting of

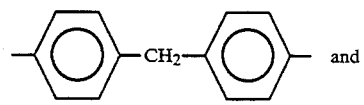 and

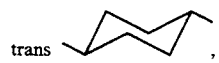

, and
R is $(-CH_2-)_x$ wherein x is a cardinal number of 1–4;
Y is $C_nF_{2n+1}$ or

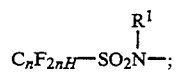

;

where n is a cardinal number of 3–20 and $R^1$ is H or alkyl of 1–4 carbon.

11 Claims, No Drawings

GAS PERMEABLE COATED POROUS MEMBRANES

CROSS REFERENCE TO RELATED APPLICATIONS

This application is a continuation-in-part of application Ser. No. 07/990,310, filed Dec. 14, 1992, now U.S. Pat. No. 5,286,279.

FIELD OF THE INVENTION

This invention relates to gas permeable materials that are hydrophobic and oleophobic. More particularly, the invention relates to materials coated with a composition that is hydrophobic and oleophobic for use in filtration and in garment constructions.

BACKGROUND OF THE INVENTION

There is a need for gas permeable materials having enhanced oleophobic and hydrophobic properties.

Gas filters and vent filters have been made from porous materials including porous polymers, such as porous polyolefins or polytetrafluoroethylene. However, the oleophobicity and hydrophobicity of such materials can be enhanced. Lack of oleophobicity has impaired use of such materials as gas filters in uses involving engines or devices that are commonly exposed to oil in the surrounding environment.

Moreover, thin flexible laminates containing porous films or membranes are useful in garment constructions, and oil and water repellency is sometimes desirable.

SUMMARY OF THE INVENTION

This invention is a flexible gas permeable material which comprises a flexible, porous, substrate material having passageways, or continuous pores, through the material and which has a coating on at least a portion of the passageways, of a composition having the formula:

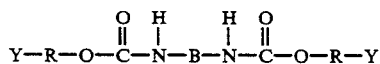

wherein
B is selected from the class consisting of

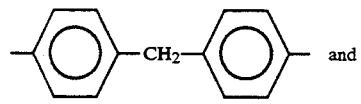

and
R is $(-CH_2-)_x$ wherein x is a cardinal number of 1-18, preferably 1-4; and
Y is $C_nF_{2n+1}$ or

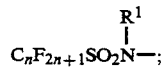

where n is a cardinal number of 3-20 and $R^1$ is H or alkyl of 1-4 carbon.

The process of the invention comprises coating the substrate material with the coating composition.

The substrate material is preferably in sheet form and the coating coats at least a portion of the interior of the pores but does not fully block the pores. Thus, the gas permeability property of the material remains intact and the material is useful to pass gas therethrough to aid as a gas filter or a vent material. The presence of the coating renders the material more oleophobic and hydrophobic than the material without the coating. The term "porous" means that the material has continuous pores. By continuous pores or passageways as used herein is meant that the material has interstices that comprise continuous passageways extending through the thickness thereof so that the passageways open on both sides of the sheet or material.

DESCRIPTION OF THE INVENTION

The flexible porous material having passageways is a substrate for the coating. The gas permeable material can be any material that allows passage of gas, especially air. It is a material that contains interstices that comprise continuous passages extending through the thickness of the material. The passageways open on both sides. Preferably the material is flexible and is in sheet or film, tube or fiber, or plug form. The material can be a fabric, such as a nonwoven, woven, or knit fabric, or a scrim. The material can be made of paper such as filter paper, or a cloth, or a metal mesh. It can also be made of fiberglass, cellulosics, ceramics or the like. The material can also be a porous polymeric film or membrane, synthetic or natural, where the pores form the interstices or passageways. Representative polymers useful in the material include polyamide, polyurethane, polyester, polycarbonate, polyvinylidene fluoride, polyacrylic, polyolefins such as polyethylene and polypropylene, polytetrafluoroethylene, polyvinyl chloride and the like. The material will generally be from about 1 to about 200 micrometers thick. In order to promote adherance of the coating to the substrate, the substrate may have groups or moieties that have an affinity for the coating. In other words, if a substrate of polymeric material that contains fluorocarbon groups is coated with a coating that contains fluorocarbon groups, then the coating will adhere and be an effective coating. One such polymeric material is porous polytetrafluoroethylene. Similarly, if the coating contains urethane moieties, ester moieties, and amide moieties, then effective substrate polymeric materials will include porous polyurethanes, porous polyesters, porous polycarbonates and porous polyamides.

Preferably, the flexible porous material is expanded porous polytetrafluoroethylene (ePTFE) sheet made as described in U.S. Pat. No. 3,953,566 by stretching PTFE resin. The resulting product has a microstructure of nodes interconnected with fibrils. The PTFE resin is stretched so that the micropores or voids that form allow for good gas or air flow while providing liquid water resistance. These porous PTFE membranes preferably have a Gurley number of between 0.1 second and 80 seconds, depending on pore size and pore volume. The porous flexible material will generally be from about 1 to about 200 micrometers thick.

The coating compositions comprise the reaction product of perfluoroalkyl alkyl alcohol compounds with selected diisocyanates.

The preferred alcohols useful in making the compositions are of the general formula $$R_f-(CH_2)_x-OH$$

wherein $R_f$ is perfluoroalkyl, linear or branched, of between 3 and 20 carbon atoms, x is a cardinal number of 1–18, preferably 1–4. Representative $R_f$ groups include $C_4F_9-$, $C_{20}F_{41}-$, and the like. A preferred alcohol is a mixture of $F(CF_2)_n(CH_2)_2OH$ where n is from 4 to 18.

The diisocyanates used herein are methylene-di(p-phenylene isocyanate) and trans cyclohexylene diisocyanate. These diisocyanates have the formula

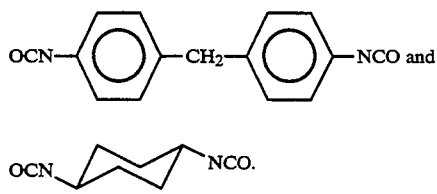

To form the coated products of the invention, the coating composition can be dissolved in a suitable organic solvent, such as an ether or ketone, in an amount of about 1–5% by weight. The concentration in the solvent will depend on the loading desired.

The coating solution is applied by any convenient means to the porous polymeric substrate. It can be spread on, dip coated, or sprayed so as to coat the pore walls but not block them. The solvent is then evaporated by any convenient means, such as heating.

The substrate may contain various other additive ingredients to impart specific properties to the product or to act as process aids. For example, it may contain ultraviolet light stabilizers, bacteriostats, and the like.

The resulting coated products exhibit good hydrophobic and oleophobic properties while having good gas or air flow through the material. The coated products can be used in applications involving gas flow-through where the coated products need to be resistant to penetration by water, oil, or lipid emulsions. For example, porous PTFE alone, normally has little oleophobicity, yet when coated with the coating described herein, the coated material is rendered oleophobic. Such applications include use in waterproof, breathable fabrics, and gas vents or filters that protect electronic equipment used in or near automotive engines and the like. Useful applications also include medical devices where venting filters are needed, and in industrial filtration, where venting filters are needed, where oil mists are present.

The coated products are also useful as filters in medical vents where oil or fatty substances in parental drip bottles can clog gas vents.

Thus, the gas permeable material is useful as a vent to vent air, water-vapor, or other gases from an interior area, but yet due to the coating prevents oils from clogging the vents.

The material can also be used as a filter to filter particulate impurities from an air stream in environments where presence of oils may tend to clog the pores of the material.

The material can also be used in garments to provide greater resistance to oils while yet allowing perspiration to evaporate.

TEST PROCEDURES

Air Permeability—Gurley Number Test

Gurley numbers were obtained as follows:
The resistance of samples to air flow was measured by a Gurley densometer (ASTM D726-58) manufactured by W. & L. E. Gurley & Sons. The results are reported in terms of Gurley number which is the time in seconds of 100 cubic centimeters of air to pass through 1 square inch of a test sample at a pressure drop of 4.88 inches of water.

Oil and Fluid Repellency Test

In these tests, oil rating data was obtained by AATCC Test Method 118-1983. The higher the number, the better the oil repellency.

The tests for gasoline, engine cleaner, motor oil, methanol, acetone and transmission fluid were carried out by the same procedure as the oil rating test, but using the fluid specified. The test temperature was as indicated. The time a drop of fluid was on the coated material was five minutes, after which the "repel" or "wet" condition was observed and recorded. By "repel" is meant that the drop did not noticeably spread.

Water Entry Pressure

The Water Entry Pressure (WEP) was measured following the Quality Control Test Method No. 584 of W. L. Gore & Associates, Inc. The WEP tester used is manufactured by Gore. Test sample is clamped between a pair of testing plates taking care not to cause damage. The lower plate has the ability to pressurize a section of the sample with water. A piece of pH paper is placed on top of the sample between the plate on the nonpressurized side as an indicator of evidence for water entry. The sample is then pressurized in small increments, waiting 10 seconds after each pressure change until a color change in the pH paper indicates the first signs of water entry. The water pressure at breakthrough or entry is recorded as the Water Entry Pressure. The test results are taken from the center of test sample to avoid erroneous results that may occur from damaged edges.

Water entry pressure below 2 psi was measured with an apparatus based upon the above WEP tester with modifications for low pressure. A sample with pH paper is held in a 25 mm clear filter holder obtained from Nuclepore Corporation, such that one side of the membrane can be pressurized with water. Water column is applied to the sample in gradual increments until a color change appears in the pH paper. The height of the water column is recorded and converted to psi.

Synthetic Perspiration Evaporation Test

The purpose of this test is to simulate the effect of human perspiration on the waterproofness of materials. The test was performed following Quality Control Test Method 510 at W. L. Gore & Associates, Inc. A specific volume of synthetic perspiration is evaporated through the test sample mounted in a fixture. Samples are then rinsed and dried before they are checked for leakage using QCTM 510 Leakage Under Low Hydrostatic Pressure. Water pressure is applied to the sample at low pressure. If water breakthrough occurs, this is judged as a leak and, therefore, the material does not maintain its waterproofness after exposure to synthetic perspiration. Otherwise, water breakthrough does not occur, sample does not leak, indicating waterproofness has been maintained.

EXAMPLES

In the following examples, $R_f$ represents $F(CF_2)_n$ in a mixture of compounds where n is approximately 6(6%), 8(50%), 10(29%), 12(11%) and 14 or higher (6%).

Coating add-on percent is by weight.

EXAMPLE 1

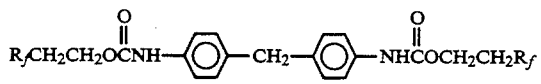

5.10 gram of methylenedi-p-phenyl diisocyanate (from Eastman Kodak) and 20.56 gram of perfluoroalkyl ethyl alcohol (Zonyl BA-N, from DuPont) were placed in a vial and then heated to 120° C. and kept at 120° C. with stirring for 1 hour and heated to 190° C. for another hour. When cooled to room temperature, the reaction product became a brown solid. Melting temperature of the reaction product was in the range of 150° to 180° C. as determined by DSC at a rate of 10° C. increase/minute in air.

1 gram of the reaction product was dissolved in 20 grams of tetrahydrofuran at 50° C. Sheets of expanded porous PTFE (ePTFE) of pore size described further below (obtained from W. L. Gore & Associates, Inc.) were dipped in the resulting solution for a time sufficient to produce a desired "add-on" amount of coating. The coated samples were air dried and then oven heated at 150° C. for 1 minute.

Test Results of Coated Samples of Example 1

|  | Air Pereability Gurley (seconds) | Oil Repellency | Water Entry Pressure |
|---|---|---|---|
| Nominal 0.2 Micron pore size ePTFE Substrate |  |  |  |
| Uncoated ePTFE substrate | 11.2 |  | Between 40–50 psi |
| Coated ePTFE (3% add-on) | 12.5 | 7 | Between 40–50 psi |
| Coated ePTFE (6% add-on) | 13.5 | 8 | Between 40–50 psi |
| Nominal 0.45 micron pore size ePTFE |  |  |  |
| Uncoated ePTFE | 10.2 | 1 30–40 psi | Between |
| Coated ePTFE (3% add-on) | 11.4 | 7 | Between 25–30 psi |
| Coated ePTFE (6% add-on) | 13.2 | 8 | Between 25–30 psi |

Thermal Stability Test

Three pieces of nominal 0.45 micron pore size expanded porous polytetrafluoroethylene membranes were coated at 9% add-on weight with the same coating procedure as used in Example 1.

The coated membrane was placed in an oven under the conditions recited following and then tested as shown:

|  |  | Oil Repellency | Isopropyl Alcohol Repellency |
|---|---|---|---|
| (A) | an oven at 130° C. for 7 days continuously (in air) | 8 | repel |
| (B) | an oven at 150° C. for 3 days continuously (in air) | 8 | repel |
| (C) | an oven at 230° C. for 30 seconds (in air) | 8 | repel |

Hydrolytic Stability Test

A piece of nominal 0.45 micron pore size expanded porous PTFE membrane coated with the coating composition at 6% add-on weight with the same coating procedure as in Example 1. It was placed in boiling water and boiled with stirring for 60 minutes.

After the treatment, the coated membrane retained oil and its 2-isopropyl alcohol repellency.

Automotive Fluids Test

A piece of nominal 0.45 micron pore size expanded porous PTFE membrane was coated at 6% add-on weight with the same coating procedure as in Example 1 with the coating composition, and tested for repellency towards the following fluids.

| Fluids | Room Temp. (3 day) | 70° C. (24 hrs) |
|---|---|---|
| Motor Oil | repel | repel |
| Transmission Fluid | repel | repel |
| Power Steering Fluid | repel | repel |
| Engine Cleaner | repel | repel |
| Brake Fluids | repel | repel |
| Antifreeze | repel | repel |
| Gasoline | repel | test not run |

Acid—Base Stability Test

Four pieces of nominal 0.2 micron pore size ePTFE membranes coated with the coating product, (6% add-on weight with the coating procedure as in Example 1) were dipped into the following acids or bases and held submerged for 90 hours continuously. Then the coated membranes were rinsed with distilled water and tested for repellency and fluid repellency.

|  | Oil rating | Isopropyl Alcohol | Acetone |
|---|---|---|---|
| 1 N $H_2SO_{4(aq)}$ | 8 | repel | repel |
| 37% $HCl_{(aq)}$ | 8 | repel | repel |
| 35% $HNO_{3(aq)}$ | 8 | repel | repel |
| 10 N $NaOH_{(aq)}$ | 8 | repel | repel |

After being exposed to the acids or base; the coated products retained their oil, 2-isopropyl alcohol and acetone repellency.

Synthetic Perspiration Evaporative Test

Two pieces of nominal 0.2 micron pore size ePTFE membranes laminated to a nylon fabric were coated with the coating composition at a 9% add-on weight with the same coating procedure as used in Example 1 on the membrane side, and were then tested by synthetic perspiration evaporative method before and after standard home laundries.

| | Test result | Air permeability (Gurley) |
|---|---|---|
| Uncoated laminate | fail (leak 100%) | 37 seconds |
| Coated laminate: (no wash) | pass (leak 0%) | 46 seconds |
| Coated laminate: (after 5 home laundries) | pass (leak 0%) | |
| Coated laminate: (after 10 home laundries) | pass (leak 0%) | |

EXAMPLE 2

2.70 gram of polyaromatic isocyanates (PAPI 2027 manufactured by Dow Chemical}containing about 40% methylene di(phenylene isocyanate) and 10.28 gram of perfluoroalkyl ethyl alcohol (Zonyl BA-N, from DuPont) were placed in a vial and then heated to 120° C. and kept at 120° C. with stirring for I hour and heated to 180° C. for another hour. When cooled to room temperature, the reaction product became a brown solid. Melting temperature of the reaction product was in the range of 140 to 170° C.

One gram of the product was dissolved in 20 gram tetrahydrofuran at 50° C. A sheet of expanded PTFE membrane (nominal pore size 0.2 micron) obtained from W. L. Gore & Associates was dipped into the solution, air dried, and then oven heated at 130° C. for 1 minute. Coating add-on was between 5 and 10 percent by weight. The coated membrane had an oil repellency rating of 8 and was solvent repellent to 2-propanol and acetone, and exhibited air permeability with a Gurley number of about 13 seconds.

EXAMPLE 3

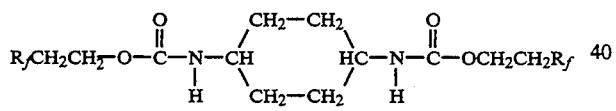

1.71 gram of trans-1, 4 t-cyclohexylene diisocyanate (from Aldrich), and 10.28 gram of perfluoroalkyl ethyl alcohol (Zonyl BA-N, from DuPont) were placed in a vial and heated to 100° C. for 15 minutes. The reaction product became a solid and was heated further up to 190° C. for 40 minutes. When cooled to room temperature, the reaction product became a brown solid.

0.3 gram of the reaction product was dissolved in 10 gram tetrahydrofuran {from Aldrich) at 45° C. A sheet of expanded PTFE membrane (average pore size 0.2 micron) made by W. L. Gore & Associates, Inc. was dipped into the solution, air dried and then oven heated at 160° C from 1 minute. Coating add-on was between 5 and 10 percent by weight. The coated membrane had an oil repellency rating of 8, and repelled 2-propanol, and repelled acetone, and an air permeability of a Gurley number of about 18 seconds.

EXAMPLE 4

Nylon polyamide membranes were obtained from Gelman Sciences, Catalog Sample # PROD. 66608, 47mm, Nylaflo\, 0.45 micron, Lot 0080207. They were coated by the procedure like that above for ePTFE except that the oven temperature was about 100° C. Test results are as follows:

| Air Permeability Gurley (seconds) | Oil Rating | Water Entry Pressure (WEP) |
|---|---|---|
| nominal 0.45 micron pore size uncoated nylon 29.6 | 0 | 0 psi (water wettable) |
| nominal 0.45 micron 38.5 | 8 | 20 psi > WEP > 15 psi |

In a like manner, porous polyvinylidene fluoride (Gelman Sciences, FP-Verice) membrane was coated with a hot isopropyl alcohol solution of the coating of Example 1, and good oil and solvent repellency was obtained. A porous polycarbonate was similarly used, as was a porous polyurethane and a porous cellulose acetate, and each had good oil and solvent repellency.

I claim:

1. A flexible gas permeable material which comprises a flexible, porous material having passageways through the material, and which has a coating on at least a portion of the passageways, of a composition having the formula:

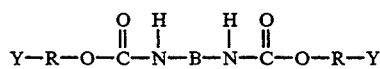

wherein

B is selected from the class consisting of

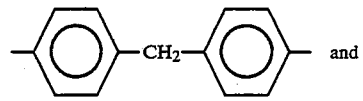

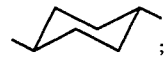

;

and

R is $(-CH_2-)_x$ wherein x is a cardinal number of 1-4; and

Y is $C_nF_{2n+1}$ or

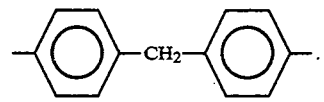

where n is a cardinal number of 3-20 and $R^1$ is H or alkyl of 1-4 carbon.

2. The gas permeable material of claim 1 wherein in the coating composition B is

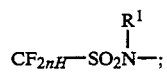

.

3. The gas permeable material of claim 1 wherein in the coating composition B is

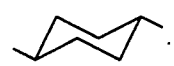

.

4. The flexible gas permeable material of claim 1 in which the material having passageways through the material is selected from the class consisting of fabric, paper, metal and polymeric film.

5. The flexible gas permeable material of claim 1 in which the material having passageways through the material is selected from the class consisting of porous polytetrafluoroethylene, porous polyamides, porous polyesters, porous polycarbonates, and porous polyurethanes.

6. The flexible gas permeable material of claim 1 in which the material having passageways through the material is porous polytetrafluoroethylene.

7. The flexible gas permeable material of claim 6 in which the porous polytetrafluoroethylene is microporous polytetrafluoroethylene.

8. The flexible, gas permeable material of claim 1 in a garment.

9. The flexible, gas permeable material of claim 1 as the filter media in a filtration device.

10. The flexible, gas permeable material of claim 1 as the vent media in a gas venting device.

11. A flexible gas permeable material which comprises a flexible, porous material having passageways through the material, and which has a coating on at least a portion of the passageways, of a composition having the formula:

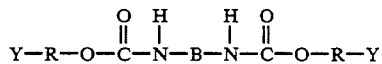

wherein
B is selected from the class consisting of

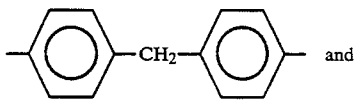 and

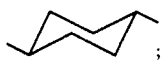 ;

and
R is $(-CH_2-)_x$ wherein x is a cardinal number of 1-18; and
Y is $C_nF_{2n+1}$ or

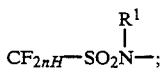

where n is a cardinal number of 3-20 and $R^1$ is H or alkyl of 1-4 carbon.

* * * * *